No. 743,321. PATENTED NOV. 3, 1903.
C. A. OVERTON.
STOVEPIPE JOINT.
APPLICATION FILED MAY 26, 1903.
NO MODEL.

Witnesses
F. A. Barrow
M. A. Schmidt

Inventor
C. A. Overton
by Milo B. Stevens & Co.
Attorneys

No. 743,321. Patented November 3, 1903.

UNITED STATES PATENT OFFICE.

CHARLES AUGUSTUS OVERTON, OF DUNLAP, IOWA, ASSIGNOR OF ONE-HALF TO JOHN F. MERRITT AND CHARLES M. NELSON, OF DUNLAP, IOWA.

STOVEPIPE-JOINT.

SPECIFICATION forming part of Letters Patent No. 743,321, dated November 3, 1903.

Application filed May 26, 1903. Serial No. 158,851. (No model.)

*To all whom it may concern:*

Be it known that I, CHARLES AUGUSTUS OVERTON, a citizen of the United States, residing at Dunlap, in the county of Harrison and State of Iowa, have invented new and useful Improvements in Stovepipe-Joints, of which the following is a specification.

My invention relates to improvements in stovepipe-joints, and has for its object improved means for coupling sections of stovepiping.

A further object is to provide means for securing the sections together, so that they cannot turn on each other.

With this and other objects in view the invention comprises an arrangement and combination of parts hereinafter described and claimed.

Figure 1:
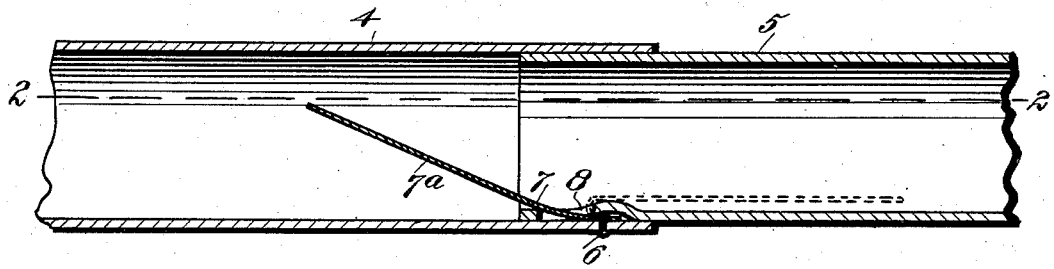
Figure 2:
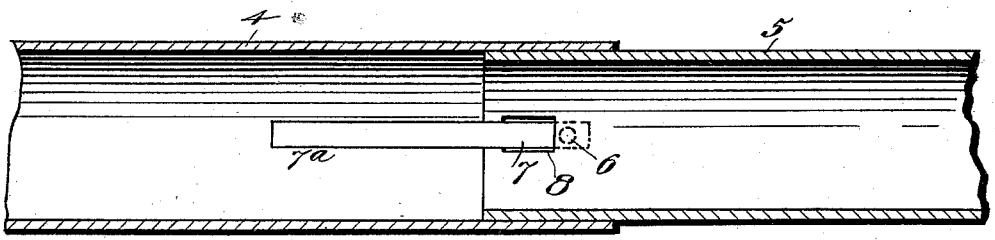

In the accompanying drawings, Figure 1 is a vertical section of my invention. Fig. 2 is a horizontal section on the line 2 2 of Fig. 1.

Referring specifically to the drawings, 4 and 5 indicate, respectively, two telescoping sections of stovepiping. To the outer pipe 4, on the inside and near the end thereof, as at 6, I rivet or otherwise secure a thin flexible strip 7 of suitable metal, which extends backwardly toward the other end of the pipe 4 and through a slot 8 in the inside pipe 5, near the end thereof. The strip permits the sections to be readily extended longitudinally in either direction, and after they are adjusted as may be desired the free end $7^a$ of the strip is bent over the edge of the slot 8 and into the pipe 5, as shown in dotted lines in Fig. 1, which securely holds the parts together. The strip also prevents the pipes from turning on each other.

Having thus described my invention, what is claimed as new, and desired to be secured by Letters Patent, is—

A stovepipe-joint comprising telescoping pipes the inner one of which is slotted at the lapped end, and a flexible strip attached to the inner side of the lapped end of the outer pipe and extending thence through the slot and backwardly from the joint toward the other end of said outer pipe, and adapted to be bent forwardly within the inner pipe.

In testimony whereof I have signed my name to this specification in the presence of two subscribing witnesses.

CHARLES AUGUSTUS OVERTON.

Witnesses:
W. H. DAVIS,
T. L. CRAFT.